Aug. 13, 1929.  W. H. STANSBURY  1,724,687
METHOD OF MIXING MATERIALS
Filed Feb. 16, 1926   2 Sheets-Sheet 2
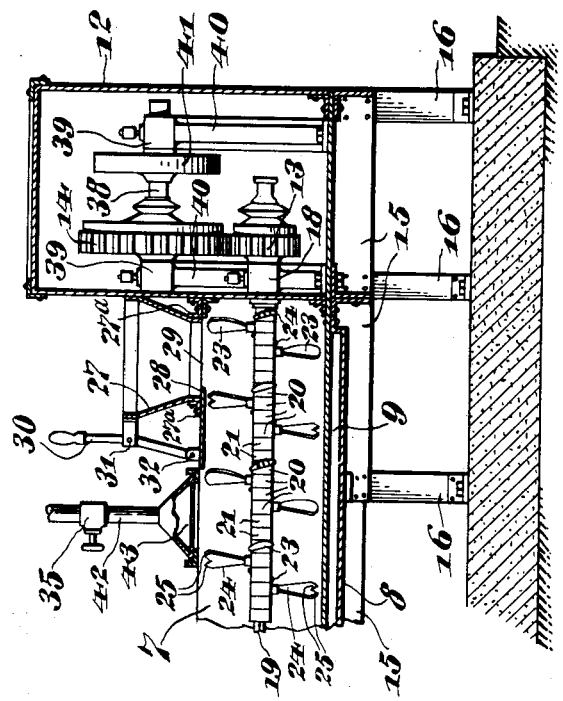
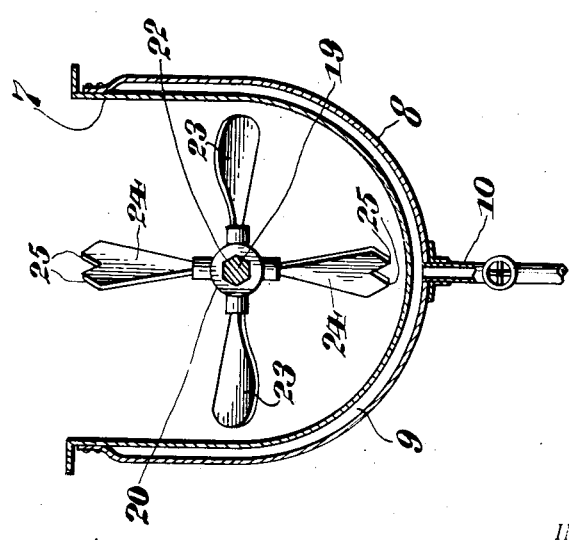
INVENTOR.
William H. Stansbury
BY Cyrus N. Anderson
ATTORNEY.

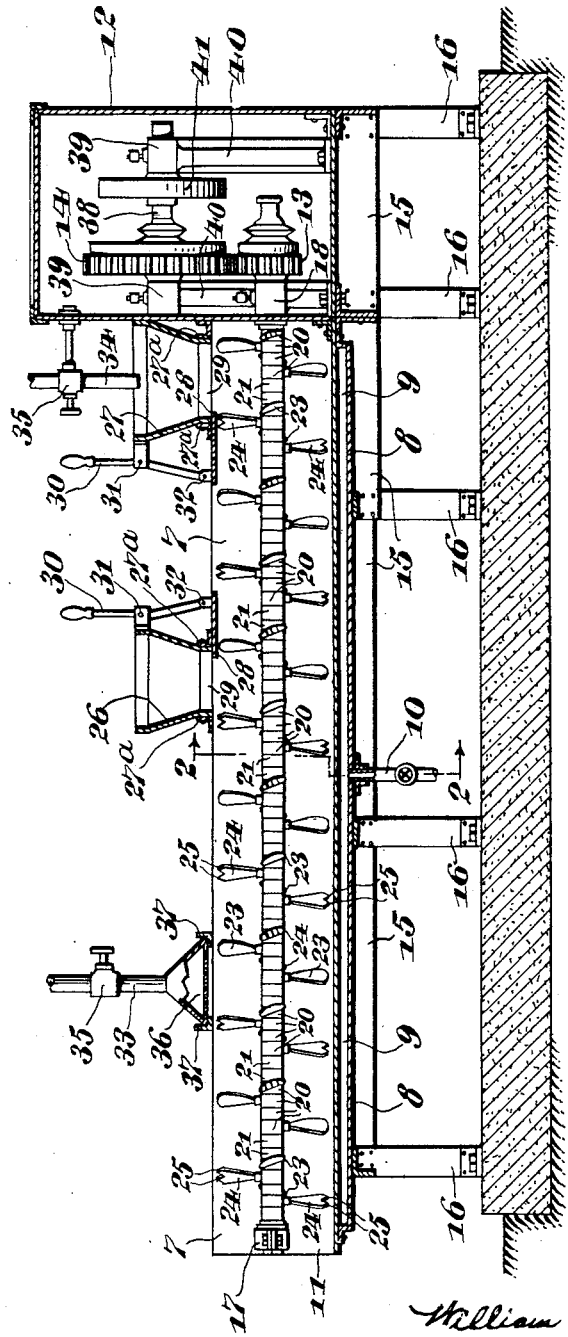

Patented Aug. 13, 1929.

1,724,687

UNITED STATES PATENT OFFICE.

WILLIAM H. STANSBURY, OF ALDAN, PENNSYLVANIA.

METHOD OF MIXING MATERIALS.

Application filed February 16, 1926. Serial No. 88,578.

In its broader aspect this invention relates to methods of mixing together material in the manufacture of composite masses, particularly those adapted for use in the building of roads and streets. More especially the invention relates to methods to be employed in the mixing of broken stone (frequently referred to as aggregate and as mineral aggregate) of different size with a binding or bonding agent, such as asphalt or tar, in proper proportions to produce a bituminous concrete adapted for use as the top layer of a road or street. Slag also may be employed alone as the mineral aggregate or in admixture with broken stone.

It is an object of the invention to provide a novel method by the employment of which the exterior surfaces of the particles or lumps of aggregate (broken stone or slag) are thoroughly coated or covered with the bonding agent whereby contiguous particles or lumps are bound together by the bonding agent and whereby a composite mass of unitary structure and requisite resilience and elasticity may be produced.

Other objects and advantages of the invention will be pointed out in the detailed description thereof which follows or will be apparent from such description.

In the practicing of the invention, it is preferable, though not necessary, that apparatus be employed and in the accompanying drawings I have illustrated one form of apparatus which may be used. In the said drawings:

Fig. 1 is a view in longitudinal section of a mixing machine or apparatus embodying the invention;

Fig. 2 is a view in transverse section taken on the line 2—2 of Fig. 1; and

Fig. 3 is a view in longitudinal section of a portion of a machine or apparatus showing a slightly modified form of construction embodying the invention.

The machine or apparatus embodying my invention as herein illustrated comprises a mixing trough 7 the top of which is shown as being open. If preferred the trough may be closed by means of doors, one edge of each of which may be hinged to the upper edge of one side of the trough while the other edge thereof is adapted to rest upon and be supported by the top edge of the opposite side of the said trough.

As has been indicated already, the binding or bonding agent preferably consists of asphalt, tar, or some other suitable bituminous material which is rendered liquid by heating before it is introduced into the trough with the aggregate. In order that this material, after its introduction into the mixing chamber of the trough, may be maintained at a temperature to keep the same in liquid or semi-liquid form so that it will readily mix with and adhere to the surfaces of the particles or lumps of the mineral aggregate (stone or slag), the bottom and sides of the said trough are surrounded by a jacket 8 to provide a chamber 9 into which live steam may be introduced from any suitable or convenient source through a valve controlled pipe 10. The end 11 of the trough is open, as shown, for the purpose of permitting the discharge of the mixed material from the mixing chamber. A secondary casing 12 adjacent one end of the trough is provided within which are mounted spur gears 13 and 14. The trough 7, casing 12 and the parts associated therewith are adapted to be supported upon a frame structure comprising the horizontal side members 15 secured to the upper ends of legs 16 the lower ends of which are connected with and supported upon a suitable bed or foundation of concrete or other material.

Bearings 17 and 18 are provided at the opposite ends of the trough 7 within which a shaft 19 is mounted which is of polygonal shape in cross section. The said shaft extends throughout substantially the full length of the trough and is provided with a plurality of hub members 20 and spacing members 21. These members are provided with bores 22 of the same polygonal shape in cross section as that of the shaft 19 in cross section. The said members are adapted to fit upon the said shaft, as is clearly shown.

The hub members 20 are provided with paddle arms 23 and 24 which serve the double function of mixing and conveying the materials employed for producing the mass longitudinally of the trough from the front to the rear end thereof to effect discharge of the thoroughly mixed ingredients of the mass through the open end of the said trough. It will be noted that the outer ends of the tips of the arms 24 terminate in teeth 25 formed by notches therein. These teeth are provided for the purpose of effecting a more thorough and complete intermingling of the materials employed to produce the final mass. The paddles 24 as well as the paddles 23 are twisted and occupy planes which extend at such angles with respect to the axis of the shaft 19 as to cause a progressive traveling movement of the materials within the trough from the front toward the rear end thereof from which they are discharged.

Hoppers 26 and 27 are mounted upon angle irons 27ª supported upon the upper edges of the opposite sides of the trough 7. These hoppers are located directly above the open top of the trough. The aggregates employed in the production of the mass preferably should be introduced through these hoppers.

For the purpose of controlling the discharge of aggregates from the said hoppers I have provided slidable gates 28 which are adapted to open and close the openings 29 at the lower ends of the said hoppers. The slidable gates 28 are adapted to be actuated by means of hand-levers 30 pivoted intermediate their ends at 31 to projections from the respective hoppers 26 and 27. The said handles are pivotally connected at their lower ends, as at 32, to the outer ends of the said gates; that is, the ends farthest away from the hoppers.

The aggregates employed are of different sizes. The smaller aggregate of stone or slag fills the voids between the particles or lumps of the larger aggregate of stone or slag. The smaller aggregate is introduced into the trough through the hopper 26 while the larger aggregate is introduced into the trough through the hopper 27. Preferably these aggregates are supplied continuously but may be supplied intermittently if desired.

The particles or lumps of the larger aggregate introduced through the hopper 27 into the front end of the trough 7 may vary in size from say one and one quarter inches to three or three and one quarter inches, while the particles or lumps of the smaller aggregate introduced into the trough through the hopper 26 may vary in size from one half inch down to dust, the dust being excluded. The sizes of the particles or lumps of large aggregate of any mix should be substantially uniform; that is, if a mass is being made in which the larger aggregate comprises particles or lumps of stone or slag of about three inches diameter in size, that should be the average size of the particles or lumps employed in that particular mix. In another mix the particles or lumps employed may be of a smaller size, say about two inches. In such case the average size of the particles employed should be around two inches.

I prefer to employ as the bonding agent bituminous materials or substances, such as asphalt or tar, which are solid at normal atmospheric temperature. As already stated, the bonding agent is heated so as to convert the same into a liquid before it is introduced into the mixing chamber of the trough where it is intermingled with the aggregates. The interior of the trough; that is, the mixing chamber, is maintained at a temperature by means of the heating agent within the chamber 9 sufficient to maintain the bonding agent in liquid form whereby its intermingling with and adherence to the aggregates are facilitated.

Bituminous material such as asphalt or tar, boiling at different degrees of temperature, may be employed as the bonding agent. I have found in practice that in cold or winter weather it is preferable to employ a bonding medium having a boiling temperature of around 235° to 300° Fahrenheit, or even higher up to 350° Fahrenheit; while in the warmer season or in the summer a bonding medium having a boiling point of around 200° to 235° Fahrenheit may be employed to advantage. The temperature usually employed in heating the bonding medium in the wintertime is around 275° Fahrenheit. It is preferred that the bonding medium be intermingled in liquid form with the aggregates so that it will become thoroughly intermingled therewith and thoroughly cover and adhere to every part of the surface of the respective particles or lumps of the aggregates.

The bituminous binding or bonding medium, rendered liquid by heating as already indicated, is introduced into the trough 7 through pipes or conduits 33 and 34 controlled by valves 35. The pipe or conduit 33 terminates in a nozzle 36 through which the required bituminous material is discharged into the trough under pressure and in the form of a spray. The said nozzle may be supported upon the horizontal flanges of the angle plates 37.

In the preferred form of construction the bonding medium is discharged from the pipe 34 through the hopper 27 wherein its intermingling or mixing with the larger aggregate is begun. The larger aggregate and the bonding medium, having been delivered into the trough through the hopper 27, are agitated by the paddles 23 and 24 and are caused thereby to travel in the trough toward the rear or discharge end thereof. After having been moved rearwardly a distance of about one-third the length of the trough the larger aggregate is met by the smaller aggregate which is introduced through the hopper 26. The larger aggregate and the smaller aggregate should be employed in proper proportion, say about three to one. This proportion may be varied, but it is necessary that the smaller aggregate be employed in proportion sufficient to fill the voids between the particles or lumps of the larger aggregate. After having introduced the smaller aggregate into the trough the mixing by the mixing paddles 23 and 24 is continued and the mass moved rearwardly in the trough toward the discharge end thereof. An additional supply of binding or bonding medium is introduced into the trough at a point between the point of introduction thereinto of the smaller aggregate and the rear or discharge end of the trough. In the construction as illustrated the said additional supply of bonding medium is introduced at a point about mid-way between the hopper 26 and the rear or discharge end of the trough. Preferably the additional supply of bonding medium in liquid form is introduced under pressure and in the form of a spray from the pipe 33.

I have found that it requires about eighty-five to one hundred pounds of bituminous bonding medium (introduced through the pipe 34) for two thousand pounds, more or less, of the larger aggregate, and that from twenty-five to forty pounds of additional bonding agent should be supplied after the introduction of the smaller aggregate.

The spur gear 13 previously referred to is mounted on the shaft 19 and meshes with the gear 14 mounted on the counter-shaft 38 which is supported in bearings 39 upon the upper ends of standards 40. For transmitting power to the gears 13 and 14 the counter-shaft 38 is provided with a drive pulley or wheel 41 which may be belt-connected to any suitable source of power.

In the modified form of construction of apparatus as illustrated in Fig. 3 the required bonding medium which is first mixed with the large aggregate is introduced into the trough through a pipe or conduit 42 terminating in a spray nozzle 43. The only difference between this construction and that illustrated in Fig. 1 is that in the latter the bonding medium which is first intermingled with the larger aggregate is introduced with the latter through the hopper 27, whereas in the modified construction the said binding or bonding medium is introduced into the trough at a point laterally and in rear of the said hopper.

In the operation of the said apparatus and in the carrying out of the method embodying the invention the larger aggregate, consisting of particles or lumps of the size which may have been selected or determined upon, is continually introduced into the mixing trough at the front end thereof simultaneously with the continuous introduction of the bonding medium in liquid form and in proper proportions, as already indicated. The larger aggregate and the bonding medium or agent are thoroughly mixed and intermingled so as to cause the said bonding medium to thoroughly and completely coat and cover the surfaces of the particles or lumps of the aggregate material. Thereafter and at a point intermediate the opposite ends of the trough, at a greater or less distance from the front end thereof, the requisite proportion of smaller aggregate for filling the voids between the particles or lumps of the larger aggregate is introduced. After the introduction of the smaller aggregate it is thoroughly mixed and intermingled with the larger aggregate the surfaces of the particles or lumps of which have been coated or covered with the bonding medium or agent. During the mixing operation the mass is being moved from the front toward the rear end of the trough, where it is discharged. Shortly after the introduction of the smaller aggregate into the trough and after it has been more or less thoroughly intermingled with the larger aggregate an additional amount of the binding or bonding medium is introduced, preferably in the form of a spray. The agitation and mixing of the materials including the last addition of binding or bonding medium is continued by the paddles 23 and 24 and the mixed mass gradually worked and fed rearwardly until it is discharged from the open end 11 of the trough.

The materials having been mixed and intermingled in the manner and in the proportions indicated, the mass may at once be spread upon a road or street and rolled, after which it hardens and is ready for use; or the material may be shipped in bulk to a distant point where it may be desired for use. Shipping of the mass to destinations far distant from the point of mixing is possible because while the mass is kept in bulk form it does not harden sufficiently to interfere with the spreading of the same upon a road or street. After the spreading and rolling of the mass upon a road or street it hardens and owing to the fact that the bituminous material completely surrounds and binds together the particles or lumps of the aggregates a sort of cushion or bed is formed whereby the structure embodies a very desirable characteristic of resilience and elasticity.

By the method employed in the manufacture of the mass I am enabled to produce a self-sealing structure; that is, a structure of a character such that water is not permitted to pass therethrough. In consequence of this it is unnecessary to employ a top coating or treatment to constitute a seal to render the structure waterproof, as is now very frequently done. The mass may be regarded as a bituminous concrete.

As already indicated, it is preferred that both the aggregates and the binding or bonding medium be introduced into the trough continuously, but if desired the materials may be introduced intermittently.

It will be understood also that the masses may be produced in separate batches containing the quantity which may be desired.

As many changes could be made in the construction as illustrated and as described and many apparently widely different embodiments of the invention made within the scope of the claims without departing from the spirit and scope of the invention, it is intended that the matter contained in the accompanying specification and drawings shall be interpreted as illustrative and not in a limiting sense.

Having thus described by invention, what I claim and desire to secure by Letters Patent is:

1. The method of producing a bituminous concrete adapted for use in the construction of roads and streets, which consists in heating a bituminous material to render the same liquid, introducing said liquid and relatively coarse mineral aggregate into an elongated chamber, heating the said chamber to maintain the fluidity of the said material, agitating the said aggregate and said liquid bituminous material to cause the latter to completely cover the exterior surfaces of the particles or lumps of the said aggregate, causing the said mixture of aggregate and bituminous material to travel in said chamber, while agitating the same, introducing relatively fine aggregate into the said chamber and mixing it with the coarse aggregate and bituminous material, causing the mixture to continue to travel through the said chamber while the same is agitated, and introducing an additional quantity of liquid bituminous material into the said chamber and mixing the same with the combined mass of coarse and fine aggregate and the previously introduced bituminous material, and discharging the same from said chamber.

2. The method of producing a concrete mass adapted for use in the construction of roads and streets, which consist in heating a bituminous bonding medium to render the same fluid, introducing said heated bonding medium and mineral aggregate into a mixing chamber, agitating the same and causing movement thereof toward a discharge outlet from said chamber, thereafter introducing a mineral aggregate of relatively small size and an additional quantity of bituminous bonding medium heated to render it fluid into said chamber and continuing the agitation thereof, and maintaining the interior of said chamber at a temperature sufficient to maintain the said bonding medium in a fluid state.

In testimony that I claim the foregoing as my invention, I have hereunto signed my name this 15th day of February, A. D., 1926.

WILLIAM H. STANSBURY.